Figure 1:
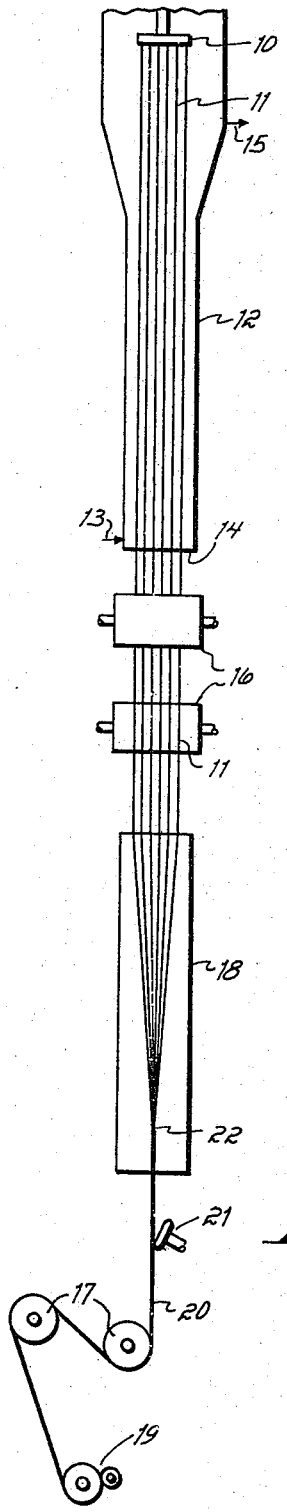
Figure 2:
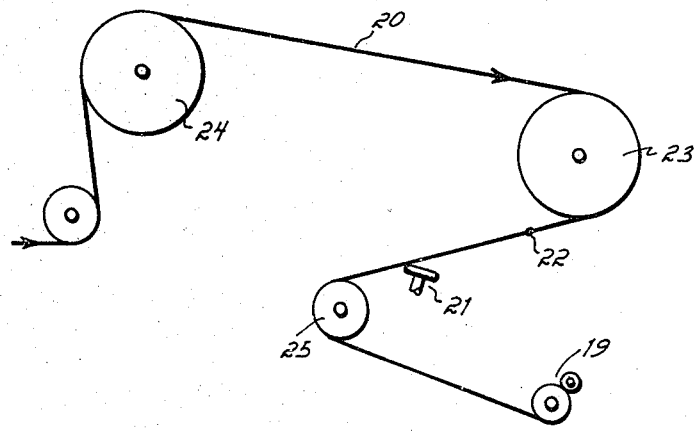
Figure 3:
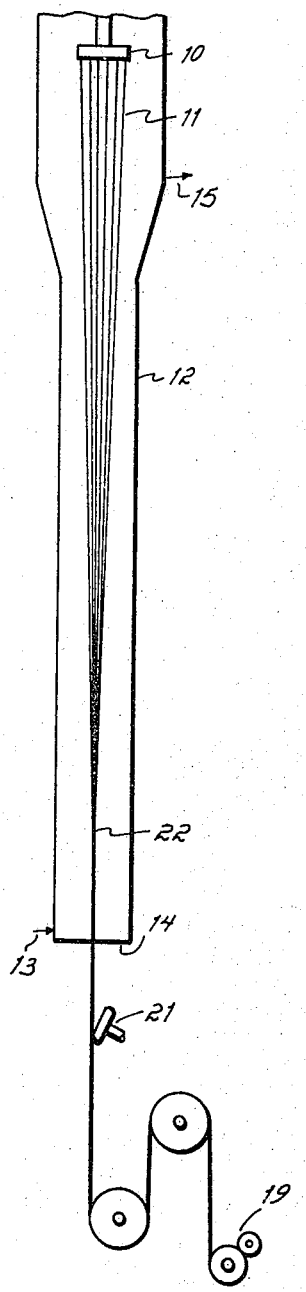
Figure 4:
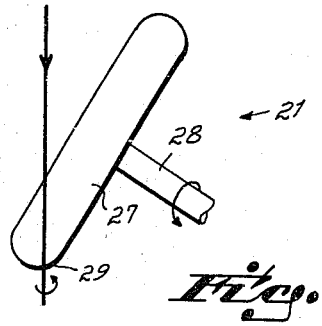
Figure 5:
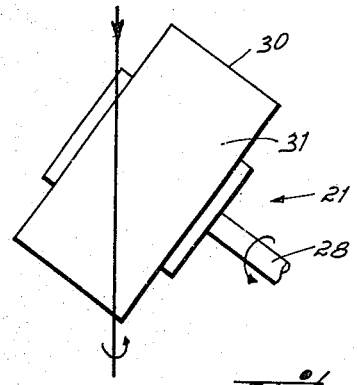
Figure 6:
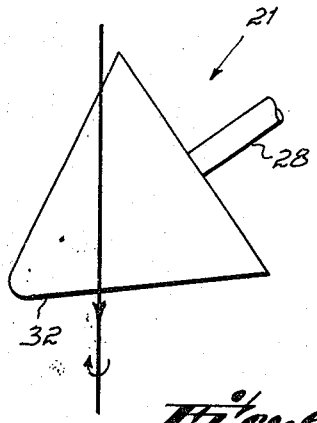

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 6, 1970

870 O.G. 17

T870,001
COALESCENCE OF MONOFILAMENT FIBERS INTO MULTIFILAMENT YARN

James R. G. Pearman and Champe O. Bachelder, both of P.O. Box 511, Kingsport, Tenn. 37662

Filed July 28, 1967, Ser. No. 656,740
Int. Cl. D04h *3/16*
U.S. Cl. 156—167
2 Sheets Drawing. 28 Pages Specification

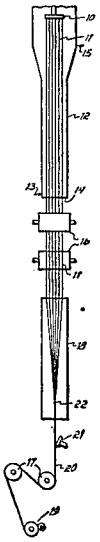

A method and apparatus for coalescing substantially fully cured spandex fibers so as to form coalesced multifilament yarn. A bundle of fibers is either twisted at a coalescing temperature, or is first twisted and then heated to coalescing temperature, e.g., 110° C.–260° C., after which it is cooled below such a temperature. The twisting may be transitory so that no twist is present in the cooled coalesced yarn. The twisting may be by means of a gaseous vortex or by a moving canted surface such as by contact with a rotating canted disc.

Jan. 6, 1970 J. R. G. PEARMAN ET AL T870,001

COALESCENCE OF MONOFILAMENT FIBERS INTO MULTIFILAMENT YARN

Filed July 28, 1967 2 Sheets-Sheet 1

JAMES R. G. PEARMAN
CHAMPE O. BACHELDER
INVENTORS

BY William T. French
Charles L. Good
ATTORNEYS

COALESCENCE OF MONOFILAMENT FIBERS INTO MULTIFILAMENT YARN

Filed July 28, 1967 2 Sheets-Sheet 2

JAMES R. G. PEARMAN
CHAMPE O. BACHELDER
INVENTORS
BY William J. French
Charles L. Good
ATTORNEYS